Figure 1:
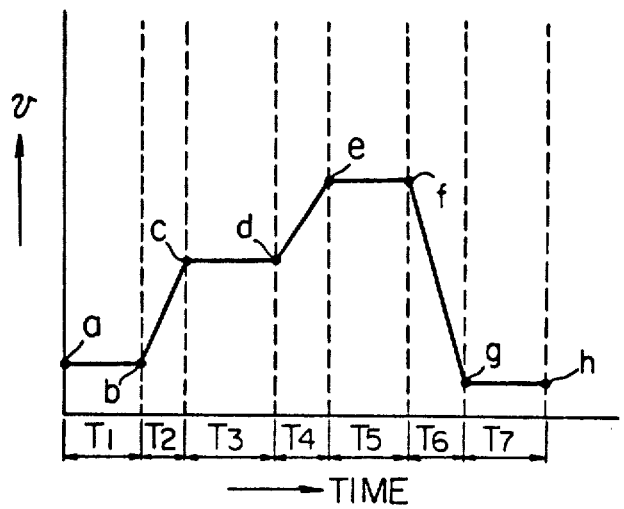

United States Patent [19]
Ishizawa et al.

[11] 3,893,010
[45] July 1, 1975

[54] SAMPLING SYSTEM FOR PROCESSING TEXTILE MATERIAL IN A WET CONDITION

[75] Inventors: Kazutomo Ishizawa, Osaka; Takahuni Akashi, Kyoto; Sadao Otake, Kobe, all of Japan

[73] Assignee: Kanegafuchi Boseki Kabushiki Kaisha, Japan

[22] Filed: Nov. 6, 1973

[21] Appl. No.: 413,311

Related U.S. Application Data

[63] Continuation of Ser. No. 232,390, March 7, 1972, which is a continuation-in-part of Ser. No. 859,825, Sept. 22, 1969, abandoned.

[30] Foreign Application Priority Data

| Sept. 24, 1968 | Japan | 43-68518 |
| Sept. 24, 1968 | Japan | 43-68520 |
| Sept. 24, 1968 | Japan | 43-68521 |

[52] U.S. Cl. .................. 318/636; 318/609; 8/158
[51] Int. Cl.² ................. G05B 21/02; D06P 1/00
[58] Field of Search ......... 318/609, 610, 636; 8/158

[56] References Cited
UNITED STATES PATENTS

| 3,490,691 | 1/1970 | Uyetani et al. | 318/609 X |
| 3,532,956 | 10/1970 | Simon | 318/609 |

*Primary Examiner*—T. E. Lynch
*Attorney, Agent, or Firm*—Robert E. Burns; Emmanuel J. Lobato; Bruce L. Adams

[57] ABSTRACT

A relay type feedback control method with sampling for controlling the wet processing of textile material, such as a dyeing process, comprises holding an output signal of an on-off control device by a zero-order holding device for a predetermined holding time and selectively changing the holding time at various sampling instants. The holding time is principally changed at each sampling instant in accordance with a preselected program so that input of the controlled process is capable of being adjusted to coincide with a predetermined trapezoidal program.

5 Claims, 14 Drawing Figures

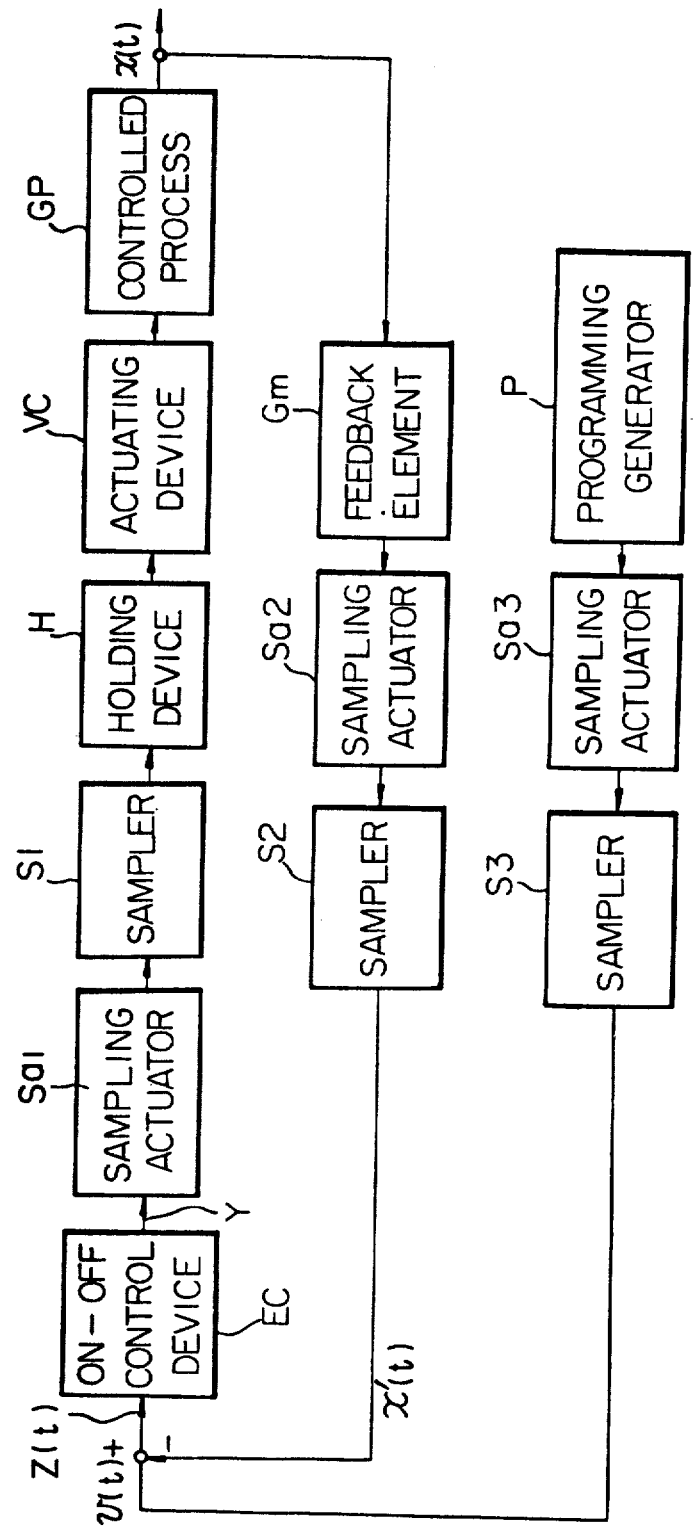

SAMPLING SYSTEM FOR PROCESSING TEXTILE MATERIAL IN A WET CONDITION

This is a continuation of application Ser. No. 232,390 filed Mar. 7, 1972 which in turn in a continuation-in-part of application Ser. No. 859,825 filed Sept. 22, 1969 and now abandoned.

The present invention relates to a method of automatically controlling the processing variables of a control system for the wet processing of textile material and more particularly, relates to a method for automatically controlling the processing temperature of a control system for the processing of textile material in a wet condition wherein each operation is performed by means of a relay type feedback control with sampling and the gain adjustment thereof is carried out in accordance with predetermined holding times. The above-mentioned relay type feedback control system with sampling is hereinafter referred to as a sampling on-off control system.

It is generally known that programed control of the temperature in a heating process, such as a batch system dyeing process, is very difficult to carry out because the characteristics of the heating process depend upon the temperature itself so that the characteristics vary remarkably.

In the case where a control program is represented trapezoidally, the temperature of the heating process is controlled so that the temperature is similarly controlled in a trapezoidal program form (the above-mentioned program is hereinafter referred to as a trapezoidal program) and therefore certain problems caused by the distinct variation of the characteristics of the controlled process are inevitable. Further, it is known that if an on-off sampling action is applied to the control system of the above-mentioned heating process in the wet processing of textile material, it is impossible to carry out an effective control action to obtain proper control effect. Consequently, in order to obtain the desired control effect, a so-called superior control device is employed wherein a proportional plus integral plus derivative control action (pid control action) is carried out to attain the above-mentioned trapezoidal program control.

However, in the case of simultaneously operating a plurality of control systems, for example, a group of batch system dyeing equipment, a group of heating equipment or treating baths, in spite of the trapezoidal program controls being required, the conventional scanning method widely used for on-off sampling control by a constant temperature process can not be applied. Also, the above-mentioned superior pid control action cannot be applied because an individual control device is required for each of the plurality of control systems and consequently high cost of equipment cannot be avoided.

The principal object of the present invention is to eliminate the above-mentioned drawbacks by providing a novel method for automatically adjusting the gain of the on-off sampling control system for the wet processing of textile material applied for controlling a heating process according to a predetermined trapezoidal temperature program.

Another object of the present invention is to provide a novel method for automatically processing textile material in a wet condition wherein each operation is carried out by means of a sampling on-off control system and the gain adjustment thereof is attained in accordance with a predetermined holding time instead of changing the gain itself, whereby the above-mentioned drawbacks of the conventional method are completely eliminated.

A further object of the present invention is to provide a novel sampling on-off control system for controlling a batch process comprising a plurality of controlled systems.

A still further object of the present invention is to provide a novel sampling on-off control system for controlling an automatic dyeing process comprising dyeing operations of a group of dyeing baths, effectively.

Figure 3:
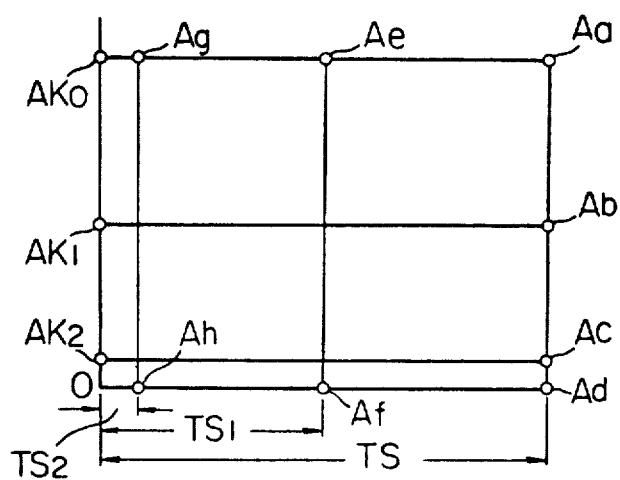
Figure 4:
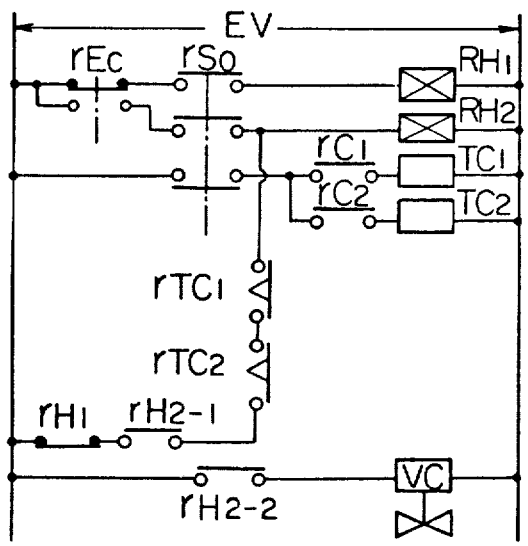
Figure 5A:
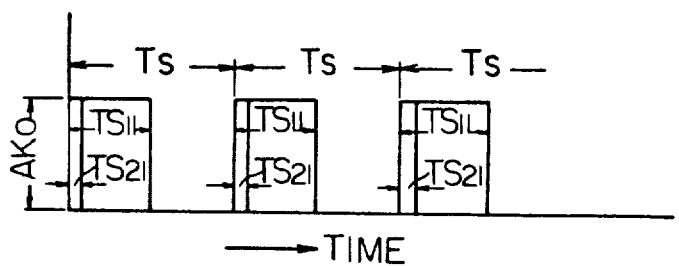
Figure 5B:
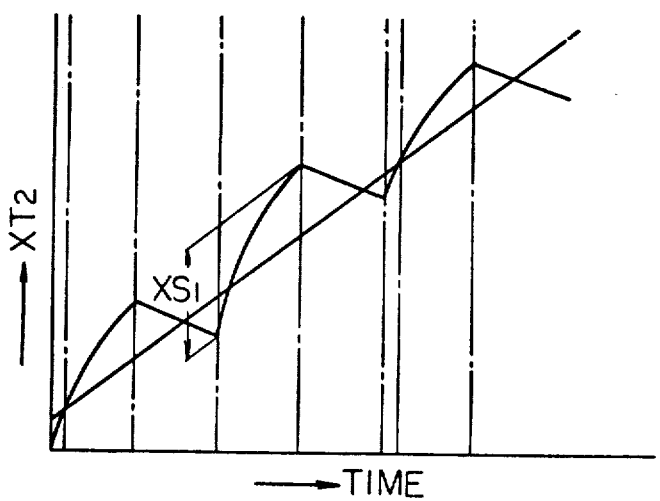
Figure 5C:
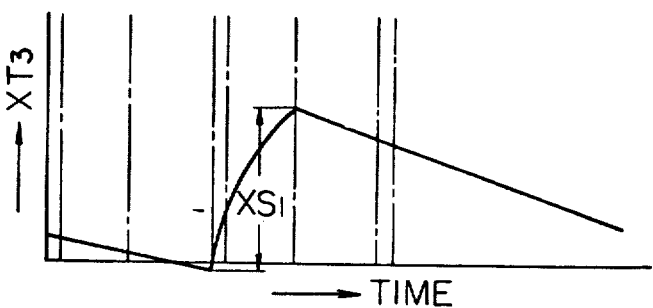
Figure 5D:
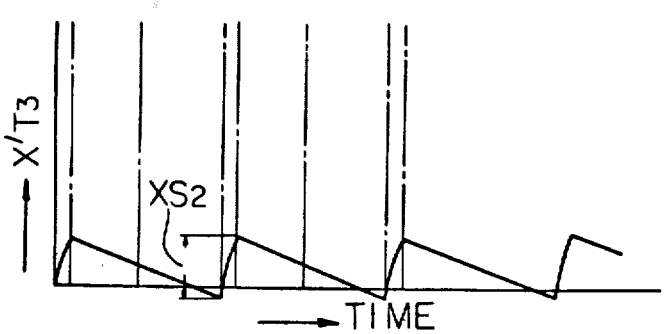
Figure 6A:
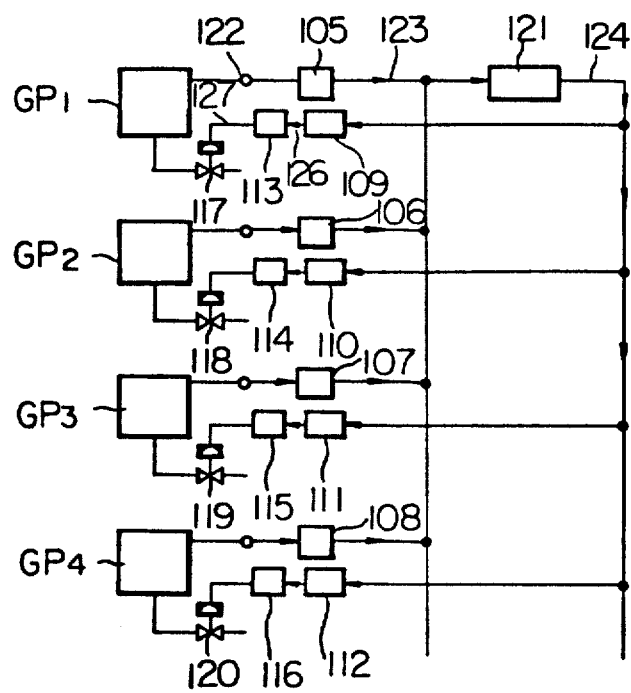
Figure 6B:
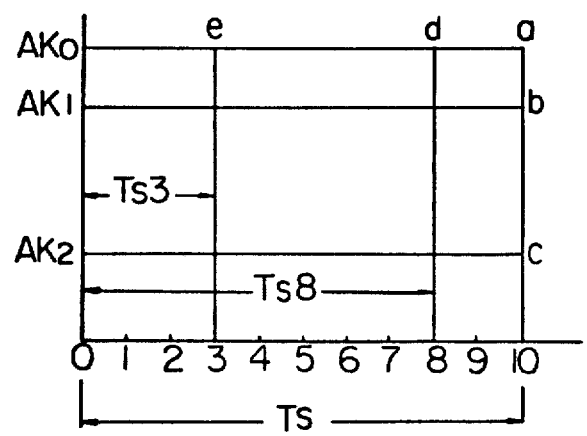
Figure 6C:
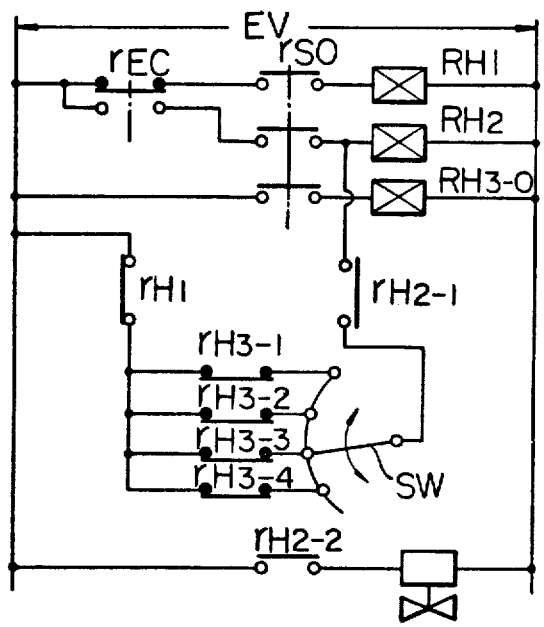
Figure 7:
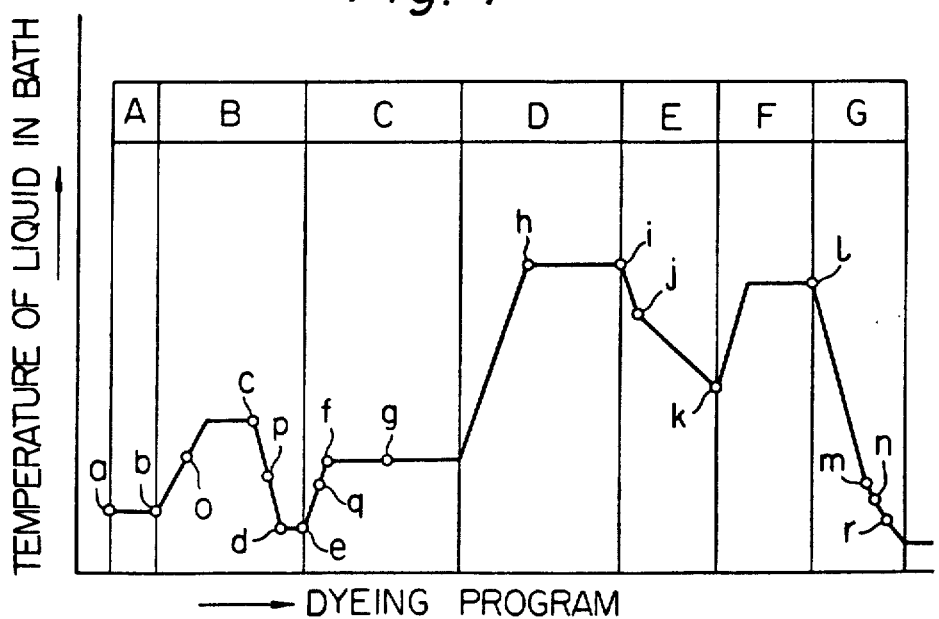
Figure 8:
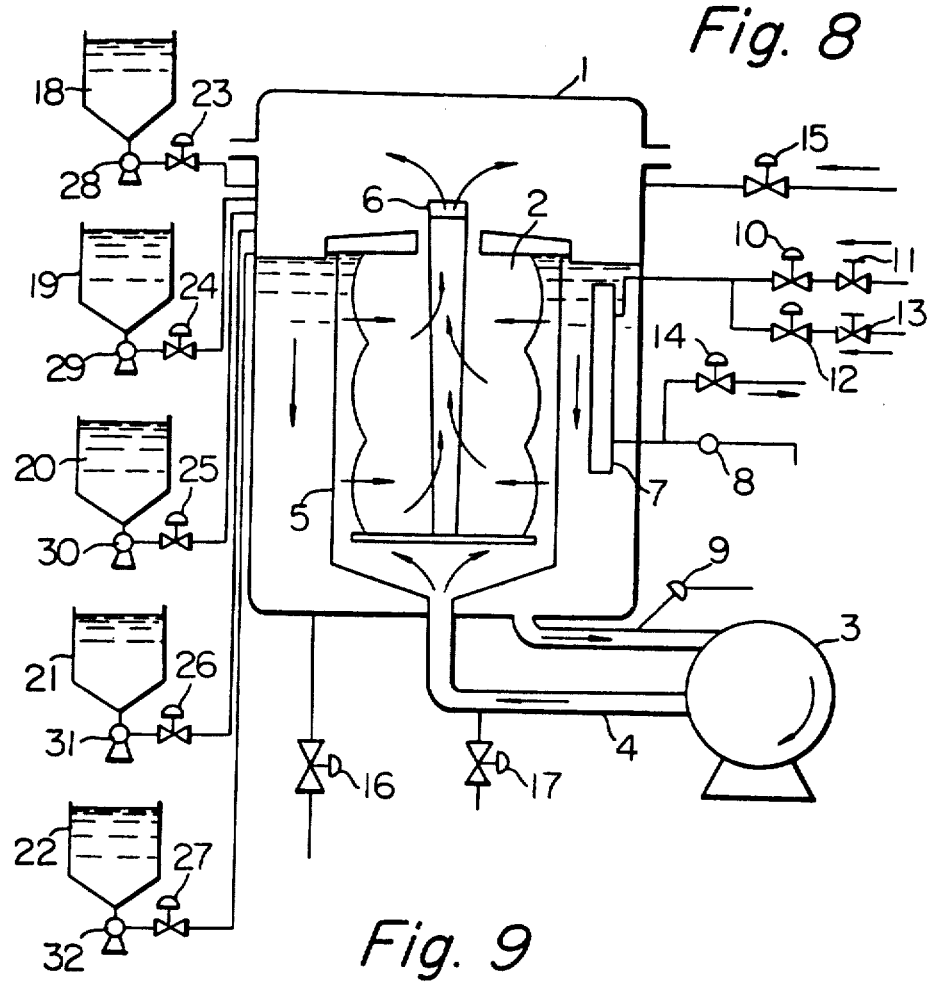
Figure 9:
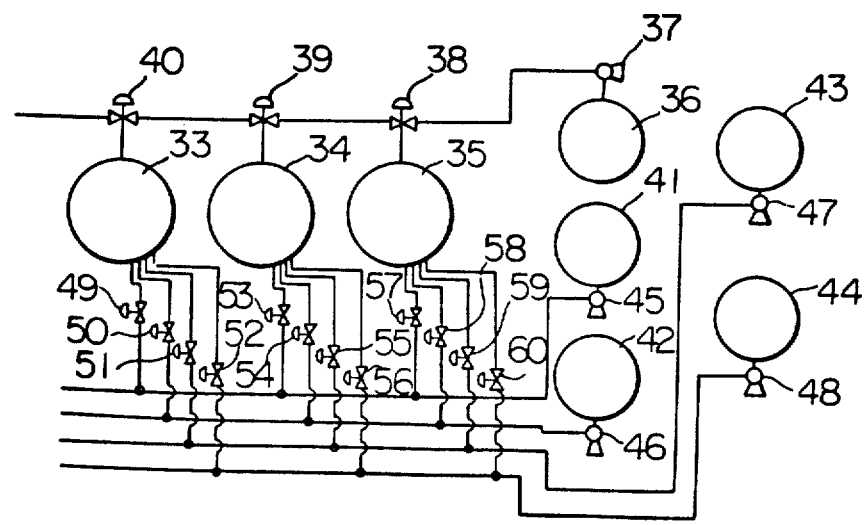

Additional objects, advantages and features of the invention reside in the particular steps of this method and their application as will be described in the specification and accompanying drawings in which:

FIG. 1 is a programing diagram of a conventional trapezoidal program control system, FIG. 2 is an example of a block diagram of a sampling on-off control system applied for a conventional programing control of a process, FIG. 3 is an explanatory diagram of a gain adjustment of the sampling on-off control system applied for an automatic dyeing process of textile material according to the present invention, FIG. 4 is an embodiment of a sampling device applied for carrying out the gain adjustment shown in FIG. 3, FIGS. 5A, 5B, 5C and 5D are diagrams for illustrating the results obtained by applying the gain adjustment of the present invention to an automatic control system for treating textile materials in a wet condition, wherein the process is carried out by a trapezoidal programing control system, FIG. 6A is an explanatory drawing showing a control system comprising a plurality of controlled processes, FIG. 6B is an explanatory diagram of a gain adjustment of the sampling on-off control system comprising a plurality of controlled processes according to the present invention, FIG. 6C is another embodiment of a sampling device for carrying out the gain adjustment of a sampling on-off control system comprising a plurality of controlled systems, according to the present invention, FIG. 7 is an explanatory program diagram of the treating temperature for carrying out an automatic continuous dyeing process of a textile material according to the present invention, FIG. 8 is a schematic diagram of a dyeing apparatus for carrying out the dyeing process in accordance with the programing diagram shown in FIG. 7, FIG. 9 is a schematic diagram of a group of dye baths for carrying out the automatic continuous dyeing process according to the present invention.

In order to simplify the illustration of the present invention, a principle of the gain adjustment of the sampling on-off control system according to the present invention is initially explained.

In FIG. 1 showing the programing diagram of a conventional trapezoidal program control system, $v$ is the set value of the system; $T_1$, $T_3$, $T_5$ and $T_7$, the periods wherein the set value $v$ of each period is maintained at a constant level; $T_2$ and $T_4$, the periods wherein the set value $v$ of each period is in a rising condition; $T_6$, the period wherein the set value $v$ is in a falling condition; $a, b, c, d, e, f, g$ and $h$, sampling instants where the set value of each sampling time $T_1, \ldots T_7$ starts to change.

Referring to FIg. 2 showing a block diagram of a sampling on-off control system wherein the set value $v(t)$ of the program control system is changed trapezoidally, EC represents an example of an on-off control device; Y, output signal of the on-off control device EC; H, holding device which holds the output signal, that is, the on or off signal of the on-off control device EC is a continuous form during the respective sampling period; VC, an actuating device of the holding device; Gp, controlled process; $x(t)$, controlled output, Gm, feedback elements; $x'(t)$, feedback signal of the feedback element Gm; P, a programing generator which generates the set value $v(t)$ in accordance with the predetermined trapezoidal programing control; $S_1$, $S_2$ and $S_3$, samplers of the sampling control system, respectively, with actuate together so that the contacts of the control circuit in only closed during the period of the sampling control $SA_1$, $SA_2$ and $SA_3$ sampling actuators of the sampler $S_1$, $S_2$ and $S_3$, respectively.

The programing sampling on-off control operation of the controlled process Gp is carried out as follows: When the samplers $S_1$, $S_2$ and $S_3$ are closed so that a set value $v(t)$ is applied from the programing generator P to the control system by way of the sampler $S_3$, the feedback signal $x'(t)$, which corresponds to the controlled output $x(t)$, is fed into the control system by way of the feedback element Gm and the sampler $S_2$ so that the difference between the set value $v(t)$ and the feedback signal $x'(t)$ is detected, an error, which is equivalent to $[v(t) - x'(t)]$, is applied to the control device EC. An on or off signal generated by the control device EC, which depends upon the positive signal or negative signal of $z(t)$, is applied to the holding device H by way of the sampler $S_1$. The holding device H holds the output signal Y of the control device EC so that the actuating device VC is maintained in an on or off condition, whereby an operating input signal is fed to the controlled process Gp. At this time, the samplers $S_1$, $S_2$ and $S_3$ are released from their operating position and the holding device H holds its working condition so as to feed its holding signal to the controlled process Gp even through the output signal of the control device EC is applied to another controlled system. Next, at the time of a consecutive sampling instant, these samplers $S_1$, $S_2$ and $S_3$ are closed so that the above-mentioned feedback control system is formed and the consecutive on or off signal is applied to the holding device H with respect to a predetermined independent set value $v(t)$. As mentioned above, the output of the controlled process Gp is controlled in accordance with the programing signal of the set value $v(t)$, to trapezoidal programing control as shown in FIG. 1 is carried out.

In the diagram of gain adjustment of the sampling on-off control system shown in FIG. 3, the ordinate represents gain and the abscissa represents lapse of time. In the conventional sampling on-off control system, the gain is changed to $AK_o$, or $AK_1$, or $AK_2$ during a period TS between two adjacent sampling times so that a manipulated variable, which is proportional to the area represented by $AK_o \rightarrow Aa \rightarrow Ad \rightarrow O$ or $AK_1 \rightarrow Ab \rightarrow Ad \rightarrow O$ or $AK_2 \rightarrow Ac \rightarrow Ad \rightarrow O$, is applied to the controlled process Gp, therefore, the gain is always adjusted by changing the magnitude of gain $AK_o$, or $AK_1$ or $AK_2$. However, if the holding time within each samping period is changed only to $TS_1$ or $TS_2$ while the gain is maintained at a constant level, the same effect of the gain adjustment, as in the case of the above-mentioned conventional adjustment, can be obtained. In other words, an effective gain adjustment can be applied for the sampling on-off control system by means of adjusting the holding time within each sampling period instead of applying the adjustment of gain itself so that the same adjustment effect can be attained. Therefore, in the present invention, the sampling control system is generally carried out as follows: The holding time of each sampling time $T_1$, $T_2$, $T_3$, $T_4$, $T_5$, $T_6$, and $T_7$ is fixed at independent optimum conditions so that the control system is carried out in accordance with the predetermined trapezoidal program as shown in FIG. 1, the above-mentioned holding time is changed at each sampling instant $a$, $b$, $c$, $d$, $e$, $f$, $g$ and $h$ so as to provide an optimum condition of zero-order hold. For example, in sampling time $T_1$ in FIG. 1, the holding time $TS_2$ in FIG. 3 is applied next, the holding time $TS_2$ is changed to $TS_1$ at the sampling instant $b$ so as to adjust the gain, thereby the controlled process is controlled in accordance with the rising set value $v(t)$.

Referring to FIG. 4, an embodiment of the sampling on-off control device according to the present invention is shown and rEC is a contact of the on-off control system; rSO, a contact of a sampler of the on-off control device; $RH_1$, an electro magnetic relay which is actuated by way of the contact rEC during on-period of the output of the on-off control device and provided with a contact $rH_1$; $RH_2$, an electro magnetic relay which is actuated during the on-period of the on-off control device and provided with contact $rH_{2-1}$ and $rH_{2-2}$; $TC_1$, a delay timer provided with a contact $rTC_1$; $TC_2$, a delay timer provided with a contact $rTC_2$. Both delay timers $rTC_1$ and $rTC_2$ actuate to open the circuit of the respective contacts $rTC_1$ and $rTC_2$ after predetermined delayed times, respectively, when these timers are energized. Conversely when these delay timers $TC_1$ and $TC_2$ are de-energized, the circuits of these contacts $rTC_1$ and $rTC_2$ are closed so that the predetermined delay timers are reset, respectively. The above-mentioned operation of the delay timers $TC_1$ and $TC_2$ are repeated in accordance with the repeated energizing and de-energizing operation thereof. $rC_1$ and $rC_2$ represent change-over contacts which select the connection with the delay timer $TC_1$ or $TC_2$ alternatively and VC is an actuating device, such as a solenoid operated valve, for controlling supply of steam to the controlled process. When an electric voltage EV is applied to the above-mentioned sampling on-off control device, the contact rSO of the sampler is actuated. If the output signal of the on-off control device is an onsignal, the relay $RH_2$ is energized by way of a lower side contact of rEC and the second contact of rSO, the contacts $rH_{2-1}$ and $rH_{2-2}$ are closed so that the relay $RH_2$ is held in its condition by the connection of $rH_{2-1}$ and the actuating device VC is released from its operation by the connection of $rH_{2-2}$. When the operation of the contact of the sampler rSO of the sampling control device is completed, the second contact of rSO is opened. However, the relay $RH_2$ is held in its condition by way of the contact $rTC_1$, $rTC_2$, $rH_{2-1}$ and $rH_1$ and the actuating device VC is maintained at its released condition by the connection of $rH_{2-2}$.

As the third contact of rSO is closed when the operation of the rSO contact is completed, one of the delay timers $TC_1$ and $TC_2$ is energized by way of the contact $rC_1$ or $rC_2$. As the contact $rTC_1$ or $rTC_2$ is opened after a predetermined time controlled by the delay timer $TC_1$ or $TC_2$, the relay $RH_2$ is released from its operation, the contact $rH_{2-2}$ is opened and the actuating device VC is closed. After a sampling period is passed, as the third contact of the sample $rSO$ is opened when the contact of the sampler $rSO$ is actuated, the delay timers $TC_1$ or $TC_2$ is returned to its original condition. Next, when the on-off control device applies its off-output signal to the contact $rEC$, the relay $RH_1$ is actuated so that the contact $rH_1$ is opened, the actuating device VC is still maintained in its closed condition even when the operation of the relay $RH_1$ is completed after the completion of the actuation of the sampler contact $rSO$. Next, when the sampler $rSO$ is again actuated and so that the contact $rEC$ of the on-off control device is changed to an oncondition, the above-mentioned operation of the control device is carried out so that the actuating device VC is opened during the predetermined working period of the delay timer $TC_1$ or $TC_2$.

Now, an application of the above-mentioned control device to the control system comprising the control device EC, the sampler $S_1$, on-off signal holding device H, the controlled process Gp and the actuating device VC shown in FIG. 2 is considered.

The on-off control device EC works by an input $z(t)$ thereof, which is the difference between the output $v(t)$ of the program generator and the feedback signal $x'(t)$ which corresponds to the controlled output $x(t)$ of the controlled system, and the holding operation by the on-off holding device is released by means of delay timer $TC_1$ or $TC_2$ (shown in FIG. 4) when the holding operation for a predetermined time is completed. Therefore, if the holding time $TS_1$ or $TS_2$, shown in FIG. 3, is applied to the setting time of the delay timer $TC_1$ or $TC_2$, respectively, the actuating device VC (in FIG. 2) is operated so as to provide an input, which is represented by $AK_0 \rightarrow Ae \rightarrow Af \rightarrow O$ or $AK_0 \rightarrow Ag \rightarrow Ah \rightarrow O$ to the controlled process Gp, in other words, the gain adjustment is carried out by means of the setting time of the delay timer $TC_1$ or $TC_2$.

Now, supposing the output signal of the prgraming device P (FIG. 2) changes with the trapezoidal program shown in FIG. 1 and the gain adjustment in the sampling time $T_1$ or $T_2$ (FIG. 1) is carried out by means of the delay timer $TC_2$ or $TC_1$ (FIG. 1), wherein the setting time thereof is fixed by the holding time $TS_2$ or $TS_1$ (FIG. 3), respectively, and the programming device P operates the change-over contacts $rC_2$ and $rC_1$ (FIG. 4) so that the connection of the contact $rC_2$ changes to that of the contact $rC_1$ at the sampling instant $b$, the operation of the controlled system in the sampling time $T_1$ is controlled by the gain adjustment defined by the operation of the delay timer $TC_2$, the operation of the delay timer $TC_2$ is changed to that of the delay timer $TC_1$ at the sampling instant $b$, therefore, the operation of the controlled system is the sampling time of $T_2$ is controlled by the gain adjustment defined by the operation of the delay timer $TC_1$ having the zero-order holding time $TS_1$.

If the above-mentioned gain adjustments are suitable for carrying out the operation of the controlled device in the sampling times $T_3$, $T_4$ and $T_5$ (FIG. 1) thereof, the gain adjustment by the delay timer $TC_2$ may be applied to the sampling times $T_3$ and $T_5$, while that of the delay timer $TC_1$ may be applied to the sampling time $T_4$.

In FIGS. 5A, 5B, 5C and 5D, an example of the result obtained by applying the gain adjustment of the present invention to the sampling on-off control system in accordance with a trapezoidal program is shown. In these diagrams, each abscissa represents lapse of time, the ordinate in FIG. 5A represents the value of the controlled gain and each ordinate in FIGS. 5B, 5C and 5D represents a controlled variable. If the controlled gain represented by $AK_0$ is applied to the controlled process for a period of $TS_{11}$ is a sampling period TS, which corresponds to a rising period of the set value the controlled variable varies in a periodical cycling curve extending to both sides of the rising line as shown in FIG. 5B, wherein the cycling amplitude is shown as $XS_1$. However, if the controlled process is regulated by the controlled gain $AK_0$ for a period of $TS_1$ wherein the level of the controlled variable is expected to be constant as shown in FIG. 5D, since the transfer function of the controlled process is the same, the controlled variable of the controlled process varies in the same manner in a rising and falling curve as in the case shown in FIG. 5B when the input signal $AK_0 \times TS_{11}$ is applied. The resulting controlled variable varies with a large cycling amplitude $XS_1'$, and only a very poor controlled result is obtained. However, if the manipulated variable is changed by changing the holding time $TS_{21}$ with the controlled gain at $AK_0$, a desirable controlled effect of small amplitude $XS_2$ can be obtained as shown in FIG. 5D.

In the above-mentioned examples shown in FIGS. 5B, 5C and 5D, a controlled process having a transfer function without a dead time and a dead zone is considered, however, in the conventional on-off control system having a certain dead time and a certain dead zone, the above-mentioned difference of the controlled results may be more remarkable and the big contribution of the gain adjusting method of the present invention to the programing control system can be expected. Further, in the above-mentioned illustration, only sampling times of the set value $v(t)$ at a constant level and in a rising condition are mainly discussed, however, in a sampling time wherein the set value $v(t)$ is in a falling condition, the above-mentioned gain adjustment method can be fully applied.

Practically, the above-mentioned delay timer is realized by applying the combination of an electric condenser and resistor wherein the time constant CR is changed by changing the capacity C of the condenser or the resistance R of the resistor so as to change the setting time of the delay timer. Further, the changing of the holding time of the controlled gain can be easily carried out by means of applying a wellknown potentiometer used as a trapezoidal programing generator or applying a cam mechanism provided with cams having different shapes of cam profile.

In FIGS. 6A to 6C another embodiment of the holding method to hold an on or off control signal in the sampling period, according to the present invention, which is applied to an automatic method for treating textile material in a wet condition, is shown.

In this embodiment, a scanning operation is applied to the sampling on-off control of a plurality of controlled processes.

In FIGS. 6A, $GP_1$ to $GP_4$ are independent controlled processes, repsectively; 105 to 108 are samplers for sampling control by which a sampled input given to a single on-off control device 121 is changed from one controlled process to the other controlled process; 109 to 112 are also samplers by which an on-off control output from on-off control device 121 is changed from one controlled process to the other controlled process; 113 to 116 are holding devices which hold the on-off control output from on-off control device 121 for a predetermined period. Samplers 105 and 109 of controlled process $GP_1$ are arranged to be cooperable and similarly, the other paired samplers 106; 110, 107; 111, 108; 112 are also arranged to be cooperable.

The sampling operation carried out by the respective paired samplers with respect to the corresponding controlled process is changed over at predetermined constant intervals to carry out the sampling control operation, and thus, the operation of all paired samplers is successively scanned during their operations. That is to say, the predetermined time refers to a scanning period, and all scanning period refers to a one complete sampling period.

When the samplers 105 and 109 of controlled process $GP_1$ are in the operating condition, the controlled value of controlled process $GP_1$ is detected by a detector 122, and the detected output is fed to control device 121 via sampler 105 and by way of a line 123.

Control device 121 compares the detected output signal with the reference set value signal supplied from a program generator (not shown) so as to discriminate between a plus or minus difference of both signals, and as a result, an on or off output signal in response to the above-mentioned discrimination is given to an on-off signal holder 113, by way of lines 124, 126 and via sampler 109. The signal holder 113 holds the on or off signal which is supplied from the control device 121 and causes a magnetic valve 117 for controlling a heat source, such as stream power source, to open or close. When the sampling operation of the samplers 5 and 9 is completed and the preselected scanning period passes, the operation of the sampler 105 and 109 are switched to the operation of the next samplers 106 and 110 of the next control process $GP_2$ and, the samplers 105 and 106 or 109 and 110 are isolated. That is to say, the above-mentioned control lines of the control process $GP_1$ are switched to the control lines of the controlled process $GP_2$.

In the controlled process $GP_2$, a signal holder 114 similarly holds an on or off signal from control device 121, and as a result, magnetic valve 118 is kept in an open or closed condition. Subsequently, the operation of samplers 106, 118 is switched to that of the next samplers 107 and 111, and controlled process $GP_3$ is controlled in the same manner.

As described above, each of a plurality of controlled processes is controlled by one control device 121 according to the sampling on-off control method, in the other words, all the controlled processes $GP_1$ to $GP_4$ are scanned successively until one sampling period or cycle with respect to the controlled processes $GP_1$ – $GP_4$ is completed, and then the sampling on-off control operation by the control device 121 is again repeated for the controlled process $GP_1$. When the samplers 5 and 9 are again in operation, an on or off control signal is again given to signal holder 13 by control device 121 in response to a new output signal detected by detector 22.

In accordance with the new on or off signal being again held by signal holder 113, the magnetic valve 117 is again opened or closed.

In the above-mentioned sampling on-off control for a plurality of controlled processes, each holder and each magnetic valve of each controlled process remains in an on or off condition during several or all scanning periods, while the samplers 105 to 108 and 109 to 112 are changed over successively at every scanning period.

The above-mentioned sampling on-off control method is more particularly explained in FIG. 6B with reference to the case where ten independent controlled processes are involved.

In the drawing, the ordinate represents the control gain and the abscissa represents lapse of time. Ts is a one complete sampling period, and each interval between 0 to 10 of the abscissa is a scanning period. That is to say, 0 to 10 are change points of respective samplers in the sampling control of ten controlled processes, and each number also shows the change order of the respective samplers when the ten independent controlled processes are successively scanned.

In the conventional sampling on-off control method, the gain is changed to $AK_o$, or $AK_1$ or $AK_2$ during a sampling period TS so that a manipulated variable, which is proportional to the area represented by $AK_o \rightarrow a \rightarrow 10 \rightarrow 0$ or $AK_1 \rightarrow b \rightarrow 10 \rightarrow 0$ or $AK_2 \rightarrow C \rightarrow 10 \rightarrow 0$, is applied to the controlled processes, therefore, the gain is always adjusted by changing the magnitude of the gain $AK_o$, or $AK_1$ or $AK_2$. However, in the method of the present invention illustrated in FIG. 6B, the gain adjustment is carried out in a manner such that a constant gain $AK_o$ is always maintained while holding time is changed to $Ts$ or $Ts_3$ or $Ts8$ so that the area of $AK_o \rightarrow a \rightarrow 10 \rightarrow 0$, or $AK_o \rightarrow d \rightarrow 8 \rightarrow 0$ or $AK_o \rightarrow e \rightarrow 3 \rightarrow 0$ corresponds to the above-mentioned area of $AK_o \rightarrow a \rightarrow 10 \rightarrow 0$, or $AK_1 \rightarrow b \rightarrow 10 \rightarrow 0$ or $AK_2 \rightarrow c \rightarrow 10 \rightarrow 0$.

The above-mentioned changing of holding time can be carried out by using sampling change over signals from 0 to 10.

And, in the present embodiment, adjusting of the holding time is effectuated by dividing a one complete sampling period into ten scanning periods. For example, if the sampling change over time or a scanning period is one second, the sampling period becomes ten seconds, the $Ts_8$ illustrated in FIG. 6B shows that the holding time continues eight seconds after holding the on-off control signal from the on-off control device, and moreover, in the case of $Ts_3$, the holding time continues for three seconds.

That is to say, each holding time corresponds to a integral multiple of the scanning period.

In accordance with the method of the present embodiment, an effective gain adjustment for a plurality of controlled processes is easily achieved by applying the function of the sampling control device without any particular addition of any devices.

In FIG. 6C, $rEC$, $rH_1$, $rH_{2-1}$, $rH_{2-2}$, are contacts; $RH_1$ and $RH_2$, electro magnetic relays; VC, solenoid operated valve; $rSO$, a contact of the on-off control device or a sampler. The contact $rSO$ of the on-off control device is composed of three-way contacts and is provided with an electro-magnetic relay $RH_{3-0}$, SW is a turnable change-over contact which can be alternatively connected with one of contacts $rH_{3-1}$, $rH_{3-2}$, $rH_{3-3}$ and $rH_{3-4}$. The contact $rH_{3-1}$ is a contact which operates together with a sampler of an on-off holding device equipped for an adjacent controlled process in the present sampling control in other words, the contact $rH_{3-1}$ is the contact of an electro magnetic relay of the adjacent controlled process which corresponds to the electro magnetic relay $RH_{3-0}$. The contact $rH_{3-2}$ is a contact for an electro-magnetic relay of an on-off signal holding device equipped for the adjacent controlled system. The contacts $rH_{3-3}$ and $rH_{3-4}$ have the same function as that of $rH_{3-1}$ and $rH_{3-2}$, respectively. Therefore, if the automatic control system comprises more numbers of controlled systems, the number of the abovementioned contacts must be added.

When the contact $rEc$ of the on-off control device is set to an on condition, the electro magnetic relay $RH_2$ is energized so that the contact $rEc$ is held by the action of the contact $rH_{2-1}$ even in case the contact $rSO$ of the sampler is released from its connection, however, the holding circuit of the contact $rH_{2-1}$ is actuated at the actuating instant of a sampler for another controller system. Now, if the holding circuit is formed so that the electro magnetic relay $RH_2$ is held in its condition by way of the contacts $rH_{3-1}$ or $rH_{3-2}$, which corresponds to the electro magnetic relay $RH_{3-0}$, for example, if the turnable change-over contact SW is connected with the contact $rH_{3-3}$, holding of the holding device $RH_2$ used for holding the on-signal is released by the opening operation of the contact $rH_{3-3}$ which is actuated together with a sampler equipped for the adjacent controlled process at the time of changing over the sampling control from a controlled process to the adjacent controlled process therefore, even though there is still a certain time until the next consecutive sampling instant, the holding of the holding device $RH_2$ is released when contact $rH_3$ makes contact with the turnable change-over contact SW, which is operated in a shorter period than the sampling period, whereby the solenoid operated valve VC is closed. As illustrated in the embodiment shown in the embodiment shown in FIG. 3, the abovementioned operation can be understood to mean that the holding time $TS_2$ (FIG. 3) for holding the gain $AK_0$ is released by the action of the third contact $rH_{3-3}$ with respect to the change-over contact SW of the sampler, therefore, the holding time $TS_2$, $TS_1$ (FIG. 3) can be released by the action of the turnable change-over contact SW with respect to the contacts $rH_{3-1}$, $rH_{3-2}$, $rH_{3-3}$ and $rH_{3-4}$ or more numbers of different contacts if necessary. In the abovementioned control circuit, as shown in the example in FIG. 6C, the gain adjustment of the on-off control system is easily and perfectly carried out, as explained in the embodiment shown in FIGS. 5A, 5B, 5C and 5D, without the requirement of any additional devices. Further, it will be understood that the gain adjustment of the on-off control system can be attained by presetting the order of the change-over operation of the turnable change-over contact SW with respect to the number of contacts, or by optionally changing over the contact of the contact SW with the above-mentioned plurality of contacts one by one in accordance with the detected error which corresponds to the difference between the set value and the feedback signal, or in accordance with a rising or falling signal such as the heat load of the controlled system. The above-mentioned embodiment is illustrated in the case of an on-condition of the on-off control system according to the present invention, however, in the case of an off-condition, a similar result can be obtained by application of the holding operation in the same manner as in the on-condition situation.

Next, a practical embodiment of the gain adjustment of the present invention applied to the finishing process such as the automatic dyeing, bleaching or oiling process is hereinafter illustrated.

Generally, in an automatic treatment of textile material such as an automatic dyeing, scouring and bleaching or oiling operation in a batch system, or chemical reaction treatment of polymerization of manufacturing polymer of synthetic textile material in a batch system, the controlling of the temperature program of the treatment is always carried out by manual operation or by applying a method of a continuous on-off control system or a continuous, proportional or proportional plus integral control system using a trapezoidal control cam or programing cam or drum. In case of applying a sampling on-off control system, it is required to determine the supply of heat energy per unit time of on-off control to obtain the desirable control results, otherwise treatment temperature exceeds the required temperature in a zero-order holding time in a sampling period, whereby it is impossible to obtain a desirable control. Further, in the case of carrying out the program control by means of applying a sampling on-off control, it is required to find the gain of the on-off control system suitable for raising the temperature as well as for holding the temperature of the temperature program, and if the gain of the programing on-off control is fixed so as to be suitable for the rise in temperature of the control system, the amplitude of the cycling of the sampling on-off control system in the temperature holding time becomes excessively large, whereby it is difficult to obtain good control results. On the contrary, if the gain is fixed to be suitable for holding temperature the heat energy is not sufficient to carry out the treatment during the period of rising temperature. With respect to the well-known continuous porportional plus integral programing control method, which is applied for carrying out the programing control of liquid temperature in a treatment bath, the applicant has confirmed that it is very difficult to decide upon the optimum conditions of the proportional band, integral time. Further, it is well-known that the equipment cost per one dyeing bath is remarkably expensive because of the complicated construction of the proportional plus integral programing control system.

In the following embodiment, a very simple on-off control method is applied to carry out the program temperature control of a batch process using a plurality of treating baths in a desirably good condition. This control operation of a plurality of treatment baths, such as dyeing baths is carried out by a set of control devices characterized by a sampling on-off control system according to the present invention. Further, the gain adjustment, which is required for carrying out the on-off control in a good condition, is performed by changing the holding time of the zero-order holding device in a sampling period instead of applying the adjustment of quantity of the supply heat energy unit time, for example, instead of adjusting the opening size of a steam valve in supplying steam as a heat source, in which it is difficult to assure the precise adjustment of quantity of supply steam per unit time. Further, when it is required to distinctly change the condition of supplied heat energy, for example at a sampling instant between a period of rising temperature and a period of holding a constant temperature, the holding time of the above-mentioned gain is adjusted only so as to coincide with the required heat energy for obtaining good control results. Therefore, the programing on-off control system applied to the treatment of the textile material in a wet condition becomes a very simple and accurate one. For example, in a period of raising the temperature of the controlled process, the input of the on-off control device is obtained by detecting the difference between the rising voltage generated by driving a potentiometer with a driving motor and a voltage corresponding to the liquid temperature of the treating bath so that the program control operation can be carried out. Therefore, it is possible to make a program control system by means of the incorporating the operation of the delay timer with a potentiometer, further, certain auxiliary operations of the programing operation of the treating baths, such as feeding fresh water into the treating baths, circulation of treating liquid by a pump, supplying auxiliary agents to the treating baths, washing the baths and discharging the treating liquid from the baths etc. can be carried out easily under conditions incorporating the above-mentioned operation of the delay timers.

In the following embodiment of the present invention, the gain adjustment of the sampling on-off control system can be carried out for each treating bath spearately with optimum conditions by means of applying the above-mentioned method of adjusting the zero-order holding time within the sampling period as illustrated in the examples shown in FIGS. 3, 4 and 6. For example, in the cases of raising the liquid temperature in baths containing 1,000kg liquid or 5,000 kg liquid, if the supply heat energy per unit time of the baths is equal, in other words, the steam pressure of supply source and size of supply conduit, the surface area of the heat exchanger and heat capacity of radiation of the heat exchanger in these two cases are almost equal, the optimum condition of the zero-order holding time for a 500 kg bath can be suitably fixed at ½ of that period for a 1,000 kg bath. Further, according to the present invention, the change-over of the on-off control gain at an instant between a period of rising temperature and a period of constant temperature of the program control can be effectively operated in a similar way by adjusting the holding time of the holding device, for example, if the holding time for the period of rising temperature, wherein the liquid temperature is rising, is represented by T, the holding time for the sampling period, wherein the liquid temperature is held at a constant level, is sufficient to reduce it to T/10 or T/20 because almost 1/10 – 1/20 of the heat energy required for the rising temperature period is sufficient to control the liquid temperature of the latter case.

In FIG. 7, showing temperatures of liquid in the dyeing bath with a their related dyeing program, the diagram represents the set value (temperature of treating liquid in a bath) with respect to the procedure of the dyeing process, A designates a preparation of the process; B, pretreatment; C, preparation of dyeing; D, dyeing; E, preparation of the after treatment; F, after treatment; G, final treatment. In the diagram, letters $a - r$ represent starting instants of the above-mentioned treatments, that is supplying water to the bath, which is required for carrying out the pretreatment, is commenced at $a'$; $b'$, commencement of supplying an agent for the pretreatment; $c'$, supplying water for scouring a textile material after the pretreatment; $d'$, discharging the used liquid from the bath; $e'$, supplying fresh water, which is required for the dyeing operation, to the bath; $f'$, supplying agents, which are required for the dyeing opeation; $g'$, supplying dyestuff; $h'$, supplying additional agent or agents to the bath during the dyeing operation; $i$, supplying cool water for cooling the liquid in the bath after completion of the dyeing; $j$, supplying water for washing the textile material after the dyeing operation; $k$, supplying additional agent for carrying out the after treatment; $l$, supplying fresh water for cooling the liquid in the bath after the after treatment; $m$, supplying water for washing the textile material after the after treatment; $n$, discharging treated liquid from the dyeing bath; $o$ and $q'$, starting the driving of circulating pumps; $p$ and $r$, stopping the driving of the circular pumps. In the above-mentioned dyeing process, the programing control of each process, A, B, C, D, E, F, and G must be carried out together with the incorporated operations of the above-mentioned operations $a - r$.

Referring to FIG. 8, an embodiment of a continuous dyeing equipment of a batch system applying the control method of the present invention comprises a dyeing bath 1 for treating a textile material 2, a circulating pump 3 for circulating treating liquid into the equipment, a container 5 disposed in the dyeing bath 1, a connecting conduit 4 which connects the circulating pump 3 to the bottom end of the container 5, a horizontal tube 6 which can be inserted into the textile material 2, a heat exchanger 7 disposed in the dyeing bath 1, a trap 8 mounted on a conduit connected to the heat exchanger 7, a temperature sensing device 9 mounted on a conduit between the dyeing bath 1 and the circular pump 3, a control valve 10 for controlling the supply of steam into the dyeing bath 1, a reducing valve 11 connected in series with the control valve 10, a control valve 12 for controlling the supply of cool water to the dyeing bath 1, a reducing valve 13 connected in series with the control valve 12, a valve 14 for discharging cool water from the dyeing bath 1, a valve 15 for supplying water to the bath 1, discharging valves 16 and 17 connected to a bottom portion of the dyeing bath 1 and the connecting conduit between the dyeing bath 1 and the circular pump 3 respectively, a dye-liquid reserving bath 18 connected to the dyeing bath 1 by means of a connecting pipe, baths 19, 20, 21 and 22 reserving necessary auxiliary liquid agents for processing the dyeing operation and connected to the dyeing bath 1 by way of their connecting pipes, respectively, an operation valve 23 mounted on the connecting pipe between the dye liquid reserving bath 18 and the dyeing bath 1, valves 24, 25, 26 and 27 mounted on the respective connecting pipes of the baths 19, 20, 21 with the dyeing bath 1, pumps 28, 29, 30, 31 and 32 mounted on the respective connecting pipes between the baths 18, 19, 20, 21 22 and the dyeing bath 1. The temperature of the dyeing bath 1 is controlled by the action of a program control device comprising the control valves 10 and 12, the heat exchanger 7 and the trap 8 of the heat exchanger and discharging valve 14, in accordance with the predetermined programing of the temperature control of liquid in the dyeing bath 1. During the above-mentioned programing control operation, each process represented by $a - r$ in the diagram of FIG. 7 is carried out by operating the respective operating valve and pumps. The block diagram of the above-mentioned control system applying the sampling on-off control method according to the present invention can be represented by a similar block diagram shown in FIG. 2, wherein EC is an on-off control device for temperature control so that the liquid temperature of the dyeing bath (controlled process Gp) is on-off controlled in accordance with an error or difference $z(t)$ between the set value $v(t)$ from the temperature programing generator P and the feedback signal $x'(t)$ of the feedback element or detecting device Gm, the on-off output signal of the control device EC is held during the predetermined zero-order holding time within the sampling period by means of the holding device H. In the above-mentioned control system represented by the block diagram shown in FIG. 2, VC represented an actuating device operated by the output signal of the holding device H; $S_1$, $S_2$, $S_3$, represent samplers which actuate together during the sampling period so that the control circuit is closed. Therefore, in this embodiment of the programing on-off control of the continuous dyeing process, if the dyeing program shown in FIG. 7 is designed to the programing generator P in the block diagram shown in FIG. 2, the set value or program signal $v(t)$, which corresponds to the desired temperature of the controlled system (liquid temperature of the dyeing bath 1) is fed to the on-off control system by way of the sampler $S_3$ in accordance with the procedure of the process, while the feedback signal $x'(t)$, which corresponds to the liquid temperature of the dyeing bath 1, is measured by the feedback or detecting element Gm and compared with the set value signal $v(t)$ by way of the sampler $S_2$, and the error or difference signal $z(t)$ between $v(t)$ and $x'(t)$, $[v(t) - x'(t) = z(t)]$ is fed to the on-off control device EC. Next, the output signal of the on-off control device EC is fed to the zeroorder holding device H by way of the sampler $S_1$. The control valve 10 (FIG. 8), which corresponds to the actuating device VC in FIG. 2, is actuated by the output of the holding device H. Therefore, when the samplers $S_1$, $S_2$ and $S_3$ actuate to close the circuits of the control system of the sampling instance, the feedback signal $x'(t)$, which corresponds to the liquid temperature of the dyeing bath 1, is compared with the programing signal $v(t)$ generated by the programing generator provided with a predetermined program of the liquid temperature of the dyeing bath 1, and the error or difference $[z(t) = v(t) - x'(t)]$ is fed to the on-off control device EC. The on or off output signal of the control device EC is fed to the holding device H by way of the sampler $S_1$. In this case, the output signal of the control device EC is a positive or negative signal in spite of there being a certain dead zone. The holding device H holds the output signal of the control device EC for the zero-order holding time so that the open or closed condition of the control valve VC is held. At the next consecutive sampling instance, the action of the samplers $S_1$, $S_2$ and $S_3$ are released by the sampling signal, the output signal of the control device EC is not fed to the holding device H, however the holding device holds the condition of the control valve until the end of the holding time within the sampling period. The holding device operates again at the next consecutive sampling instant. As mentioned above, the optimum on-off control operation is carried out to control the liquid temperature of the dyeing bath 1 in accordance with the predetermined program by applying the gain adjusting method according to the present invention.

With respect to the gain adjustment of the liquid temperature control of the dyeing process, that is, when it is required to adjust the gain of the control system, particularly in the cases of sampling times wherein the liquid temperature must be raised, or held at a constant level or lowered, the gain adjustment method according to the present invention is satisfactorily applied for the present dyeing process by exchanging the holding time so that the supply of heat energy to the dyeing bath 1 or removal of heat energy from the dyeing bath 1 is carried out at constant gain, as is clearly described in the embodiments shown in FIGS. 3, 4, 5A, 5B, 5C, 5D and 6.

As is already described (FIGS. 2, 3 and 4), the above-mentioned gain adjustment is capable of being carried out very easily and simply by means of applying a combination of the delay timer and potentiometer, therefore, it is very easy to operate the automatic dyeing processes represented by $a - r$ in FIG. 7 in a related condition with the operations of the delay timers of the programing generator, with respect to the dyeing equipment shown in FIG. 8, in other words, the above-mentioned gain adjustment of the dyeing operation is capable of being carried out by applying the above-mentioned programing generator provided with the delay timer very easily and simply.

It is important that, in the case of carrying out the programing on-off control of a plurality of independent dyeing processes, these control processes can be carried out similarly by using a single control device EC, if the respective set values $v(t)$ and the feedback signals $x'(t)$ are provided separately, and samplers, which have functions similar to $S_1$, $S_2$, $S_3$, are also provided separately, but the control systems comprise a similar holding device H, actuating device VC, controlled process Gp, feedback element Gm. Therefore, the dyeing operation can be carried out in each dyeing bath independently in accordance with its own liquid temperature control program.

In an automatic dyeing equipment comprising a plurality of dyeing baths and one set of auxiliary baths for reserving liquid agent, pipings arranged for carrying out the sampling on-off control method of the present invention are shown in FIG. 9 and each dyeing bath is operated independently in accordance with its own dyeing program. Therefore, the dye liquid and additional agnets are supplied from the set of auxiliary baths to each dyeing bath independently. In the pipe arrangement, shown in FIG. 9 control valves are mounted in the connecting pipes between the dyeing baths and the auxiliary baths. That is, control valves 38, 39 and 40 are mounted in the respective pipes between each dyeing bath 33 or 34 or 35 and an auxiliary bath 36 for reserving the dye liquid so that the dye liquid can be supplied to each dyeing bath 33 or 34 of 35 independently, when pump 37 is actuated. Groups of control valves 49, 50, 51, 52 and 53, 54, 55, 56 and 57, 58, 59, 60 are mounted in connecting pipes between each dyeing bath 33, or 34 or 35 and the auxiliary baths 41, 42, 43, 44 in a similar way as the above-mentioned control valves 38, 39 and 40. Pumps 45, 46 and 47 are also mounted in these connecting pipes as shown in the drawing. In this automatic dyeing equipment, the dyeing process of each dyeing bath is carried out in the same manner as that of the former embodiment of the dyeing equipment shown in FIG. 8 in accordance with the programing control schedule as shown in FIG. 7, independently, that is, supplying of pretreatment agent $b$, supplying agents which are required for carrying out the dyeing operation $f$, supplying the dyeing liquid $g$, supplying the additional agent during the dyeing operation $h$, supplying agents for after treatment $k$ etc, are carried out with respect to each dyeing bath separately in accordance with the predetermined program by applying the present sampling on-off control system.

By experiment, it was confirmed that that abovementioned sampling on-off control system of the present invention can be easily applied for processing the scouring and bleaching of textile material, or other wet processings such as acid treatment or oiling treatment of textile material, and carrying out a batch system process such as polymerization in a process for manufacturing synthetic fibers. Further, it will be understood that the present method can be easily applied to the program on-off control system for controlling PH or pressure of treating liquid or liquid level in a container or treating bath.

What is claimed is:

1. A system for controlling the temperature of a treating liquid in a dyeing process in accordance with a predetermined trapezoidal temperature control program which contains a temperature rising, a temperature constant level and a temperature lowering program, for dyeing textile material by the treating liquid comprising:

sampling the actual temperature of the treating liquid in order to detect the difference between the actual temperature of the liquid and the temperature represented by the predetermined trapezoidal temperature control program;

holding an output signal of an on-off control device produced in response to the detected difference for a holding time by a zero-order holding device within each sampling cyclic period so that the input of the thermal exchanging medium to the dyeing process is held until said holding by said zero-order holding device is almost completed;

and changing said holding time within each sampling cylic period in accordance with predetermined exchanging programs for respective temperature rising, constant level and lowering programs of the predetermined trapezoidal temperature control program while maintaining the magnitude of said input of said thermal exchanging medium at a constant level during each holding period.

2. A system for controlling the temperature of a treating liquid in a dyeing process for dyeing textile material as claimed in claim 1; wherein said changing of said holding time within each sampling cyclic period is carried out at each sampling instant in response to a command signal from a programming generator in which a predetermined dyeing program is stored.

3. A system for controlling the temperature of treating liquid in a dyeing process for dyeing textile material as claimed in claim 1; wherein said changing of said holding time within each sampling cyclic period is carried out at each change position among said temperature rising, constant level, and lowering programs of said predetermined trapezoidal temperature control program.

4. A system for controlling the temperature of a treating liquid in each dyeing process for dyeing textile material of a plurality of dyeing processes in accordance with each individual predetermined trapezoidal temperature control program by employing a single on-off control device comprising:

sampling the actual temperature of the treating liquid of each dyeing process one after the other within a predetermined scanning period in order to detect a difference between the actual temperature of the liquid of each dyeing process and the temperature represented by the predetermined trapezoidal temperature control program for each said dyeing process;

holding an output signal of the on-off control device for a holding time within each cyclic sampling period of each said dyeing process in response to each detected temperature difference by each zero-order holding device provided for said each dyeing process so that each input of the thermal exchanging medium to each said dyeing process is held until said holding by each said zero-order holding device is almost completed;

and changing said holding time of each said dyeing process by actuation of one of the scanning signals for commanding scanning of said sampling of the actual temperature of the treating liquid with respect to said plurality of dyeing processes while maintaining the magnitude of each said input of the thermal exchanging medium to each said dyeing process at a constant level respectively during said holding time.

5. A system as claimed in claim 4; wherein said holding time held by said zero-order holding device of each said dyeing process is selected to be an integral multiple of said predetermined scanning period for each said dyeing process.

* * * * *